United States Patent [19]

Richards et al.

[11] 4,388,838
[45] Jun. 21, 1983

[54] MULTIPLE COUNTERSHAFT SIMPLE TRANSMISSION

[75] Inventors: Elmer A. Richards, Kalamazoo; Alan R. Davis, Plainwell, both of Mich.

[73] Assignee: Eaton Corporation, Cleveland, Ohio

[21] Appl. No.: 165,833

[22] Filed: Jul. 3, 1980

[51] Int. Cl.³ .......................... F16H 3/08; F16H 3/02
[52] U.S. Cl. ...................................... 74/331; 74/357; 74/360; 74/375; 74/745
[58] Field of Search ............... 74/331, 745, 360, 375, 74/339, 329, 356, 357

[56] References Cited

U.S. PATENT DOCUMENTS

| | | | |
|---|---|---|---|
| 1,918,236 | 11/1934 | Logue | 74/329 X |
| 2,669,880 | 2/1954 | Brock et al. | 74/359 X |
| 3,105,395 | 10/1963 | Perkins | 74/745 |
| 3,237,472 | 3/1966 | Perkins | 74/331 |
| 3,255,644 | 6/1966 | Warren et al. | 74/745 |
| 3,283,613 | 11/1966 | Perkins | 74/331 X |
| 3,335,616 | 8/1967 | Perkins | 74/331 |
| 3,349,635 | 10/1967 | Richards | 74/331 |
| 3,378,214 | 4/1968 | Hilsinger, Jr. | 160/300 X |
| 3,500,695 | 3/1970 | Keiser | 74/331 |
| 3,611,823 | 10/1971 | Richards et al. | 74/331 |
| 3,648,546 | 3/1972 | McNamara et al. | 74/331 X |
| 3,733,912 | 5/1973 | Murayama et al. | 74/360 X |
| 3,799,002 | 3/1974 | Richards | 74/331 X |
| 3,817,123 | 6/1974 | Whateley | 74/360 |
| 3,910,131 | 10/1975 | Richards | 74/331 |
| 3,922,931 | 12/1975 | Osujyo et al. | 74/745 |
| 4,060,005 | 11/1977 | Bost | 74/745 |
| 4,106,358 | 8/1978 | Morrison | 74/331 |
| 4,152,949 | 5/1979 | Vandervoort et al. | 74/331 |
| 4,269,077 | 5/1981 | Vandervoort | 74/359 X |

*Primary Examiner*—Leslie A. Braun
*Assistant Examiner*—Joseph M. Rolnicki
*Attorney, Agent, or Firm*—C. H. Grace; H. D. Gordon

[57] ABSTRACT

A multiple substantially identical countershaft (16, 16A), simple change gear transmission (10) having two-piece (20, 20A, 22, 22A) countershafts is provided. The use of two-piece countershafts allows the countershafts to be supported by three bearings (72, 74 and 76) while not requiring greater than normal manufacturing accuracy of the transmission housing (H). A driving connection between the front and rear countershaft portions is utilized which will allow a degree of axial misalignment between the front and rear portions and which when connected assures proper circumferential alignment of the countershaft gears. In the preferred embodiment, proper circumferential alignment of the front (20, 20A) and rear (22, 22A) countershaft portions is assured by providing a splined connection between the countershaft portions wherein the number of spline teeth (37, 66) is evenly divisible into the number of countershaft gear teeth carried by any gear on one of the countershaft portions (22, 22A) and wherein each spline tooth carried by the one countershaft portion has the same circumferential alignment with the countershaft gear teeth carried by said one portion as all of the other spline teeth carried by the one portion.

12 Claims, 4 Drawing Figures

MULTIPLE COUNTERSHAFT SIMPLE TRANSMISSION

BACKGROUND OF THE INVENTION

1. Field of the Invention

The present invention relates to multiple substantially identical countershaft, simple change gear transmissions and in particular to multiple countershaft, simple change gear transmissions wherein each of the countershafts is substantially identical and comprises a separate first and second generally coaxial piece rotating at the same rotational velocity and wherein each countershaft assembly is supported by a bearing means at each end thereof and by a third bearing means adjacent the driving connection of the two countershaft pieces.

2. Description of the Prior Art

Simple change gear transmissions, that is, transmissions utilizing a one piece mainshaft, are well known in the prior art. Transmissions utilizing either simple or compound mainshafts in connection with multiple countershafts wherein the mainshaft, the mainshaft gears and/or the countershaft gears are mounted in a radially floating manner relative to the other gears are also well known in the prior art. Examples of such transmissions may be seen by reference to U.S. Pat. Nos. 3,105,395; 3,255,644; 3,283,613; 3,335,616; 3,349,635; 3,378,214; 3,500,695; and 3,648,546, all of which are hereby incorporated by reference.

The prior art transmissions, particularly those transmissions utilizing a floating and/or pivoted mainshaft in connection with multiple substantially identical countershafts, have proven to be highly acceptable. However, to achieve a sufficiently large range and/or number of available gear ratios, it has generally been necessary to utilize a compound transmission. Such transmissions generally comprise a main transmission section and an auxiliary transmission section of either the "range" type or the "splitter" type or a combination thereof as is well known in the prior art. Such transmissions are highly effective and commercially successful, especially for use in heavy duty vehicles wherein a large range of ratios is required and/or a large number of individual gear ratios is required. Such heavy duty compound transmissions typically have 9, 10, 12, 13 or more forward gear ratios.

There has, however, developed a need for multiple substantially identical countershaft transmissions having a greater range of ratios and/or a greater number of ratios than is normally available in a simple transmission utilizing one-piece countershafts supported by two bearings as the center-line distances required in prior art simple transmissions to provide same would become too great yet not justifying the somewhat expensive structure and controls required for a compound transmission. The prior art devices have been unable to completely satisfactorily fill this need.

Attempts to fill this need include supporting countershafts by a third bearing intermediate the ends of the countershafts. This has not been satisfactory as a three bearing mount of a one-piece shaft requires greater than normal manufacturing accuracies and/or assuring correct circumferential alignment of the countershaft pieces of a two-piece countershaft assembly upon assembly or reassembly thereof has proven difficult.

Another attempt to fill this need involves the use of compounded countershafts as is seen in U.S. Pat. No. 4,152,949 hereby incorporated by reference. While such a simple transmission utilizing compounded countershafts is believed to be highly advantageous, the required additional structure and expense may not be justified for certain applications.

SUMMARY OF THE INVENTION

In accordance with the present invention, the drawbacks of the prior art have been overcome to the extent that a relatively inexpensive and easily produced simple transmission of the multiple substantially identical countershaft type which provides a greater range and/or number of available gear ratios than has heretofor been available is provided. The transmission preferably utilizes a floating mainshaft and/or floating mainshaft gear structure in connection with substantially identical multiple countershafts, each of said countershafts comprising a first and second piece being coaxially joined at a driving connection, such as a splined connection for joint rotation. The countershafts are each supported by a bearing adjacent the ends thereof and by a third bearing adjacent the spline connection.

The above is preferably accomplished by forming the generally involute countershaft gear teeth carried by one of the countershaft pieces directly on the exterior periphery of that countershaft piece (i.e. similar to exterior involute splines) and by utilizing a portion of those gear teeth as the exterior splines of the splined connection. Such a structure allows the countershafts to be easily timed (i.e. both pieces in proper circumferential alignment) and also allows a third bearing to be utilized to support the countershaft adjacent the splined connection without requiring greater than normal manufacturing accuracy of the transmission casing as the splined connection will permit a degree of nonaxial alignment of the countershaft pieces.

Accordingly, it is an object of the present invention to provide a relatively inexpensive and easily produced simple transmission of the multiple substantially identical countershaft type having an extended range and/or number of available gear ratios.

This and other objects and advantages of the present invention will become apparent from a reading of the detailed description of the preferred embodiment taken in connection with the attached drawings.

DESCRIPTION OF THE PREFERRED EMBODIMENT

Figure 1:
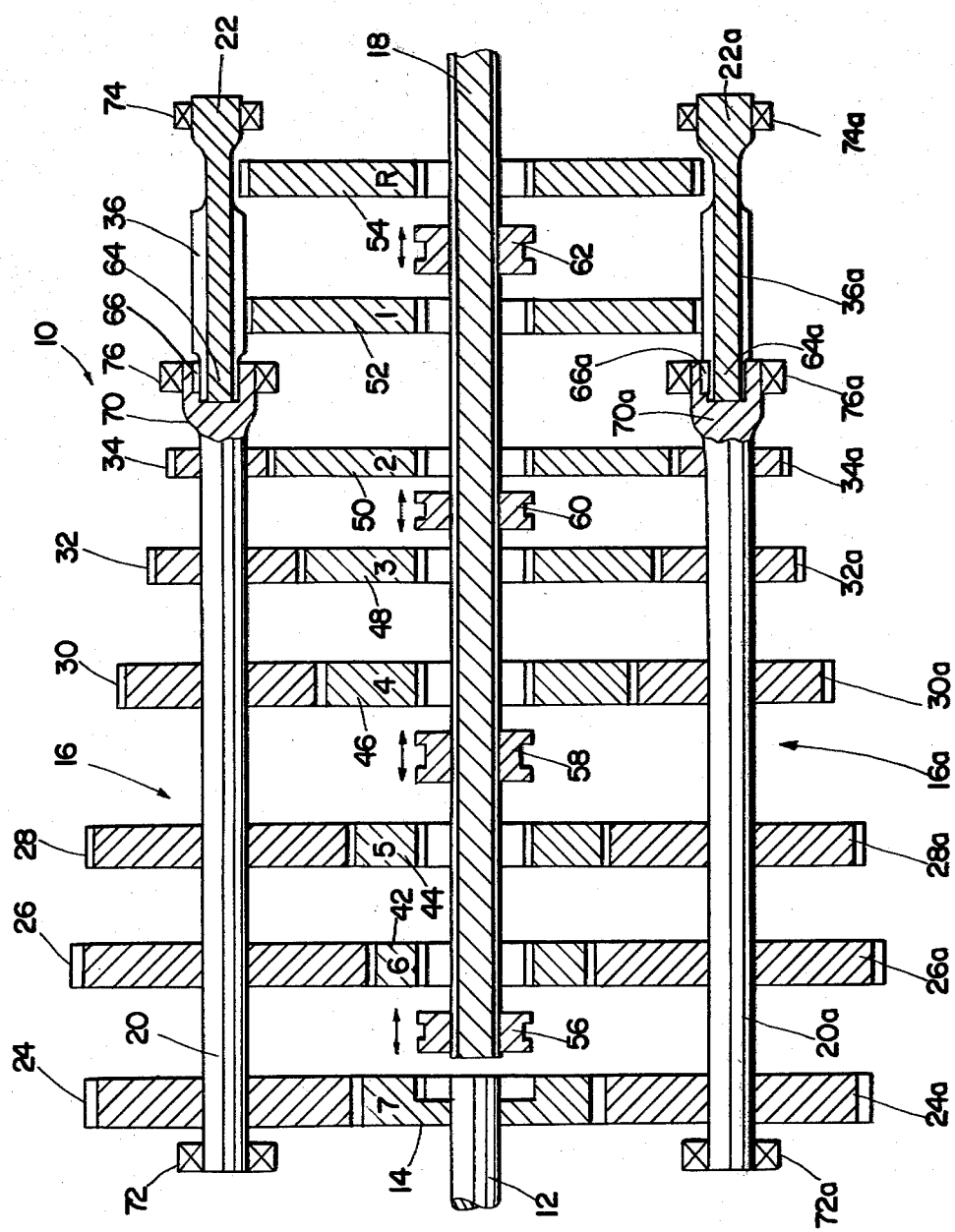
FIG. 1 is a schematic illustration of one embodiment of the present invention.

In this disclosure, certain terminology will be used for convenience in reference only and will not be limiting. For example, the terms "forward" and "rearward" will refer to directions forward and rearward of the vehicle in which the transmission is installed. The terms "rightward" and "leftward" will refer to directions as taken in the drawings in connection with which the terminology is used. The terms "inward" and "outward" will refer to directions toward and away from, respectively, the geometric center of the apparatus. All foregoing terms mentioned include the normal derivatives.

For convenience of identification, the shafts 12 have throughout been called the input shaft, and the shafts 18 have been called the main shaft and output. This terminology has, however, been used for convenience in reference and is to be given no limiting significance inasmuch as the apparatus will operate with the direction of power flow reversed.

One embodiment of the transmission of the present invention may be seen by reference to FIG. 1. The transmission 10 schematically illustrated is of the twin countershaft type, it being understood, however, that multiple countershaft transmissions having three, four or more substantially identical countershafts may utilize the features of the present invention. The transmission 10 comprises an input shaft 12 designed to be driven by the prime mover of the vehicle and carrying a drive gear 14 thereon. A pair of two-piece countershafts, or countershaft assemblies, 16 and 16A and a floating mainshaft 18 are provided. The axes of the mainshaft 18 and the compound countershafts, 16 and 16A, are substantially parallel. The axis of input shaft 12 is substantially concentric with the axis of mainshaft 18. The two-piece countershafts, 16 and 16A, are substantially identical. Each of the two-piece countershafts, 16 and 16A, comprises a forward portion or piece, 20 and 20A, and a rearward portion or piece, 22 and 22A, respectively. Forward countershaft portions, 20 and 20A, are rotatable with and are substantially coaxial with the rearward portions 22 and 22A, respectively. The forward portions 20 and 20A of the countershafts 16 and 16A, carry gears 24, 26, 28, 30, 32, 34 and 24A, 26A, 28A, 30A, 32A, 34A, respectively. The rearward portions, 22 and 22A, of the countershafts, 16 and 16A, carry gear teeth 36 and 36A, respectively. Gears 42, 44, 46, 48, 50 and 52 encircle the mainshaft 18 and are constantly engaged with and supported by the countershaft gears 26, 26A, 28, 28A, 30, 30A, 32, 32A, 34 34A, 36, 36A, respectively, as is well known in the art. Gear 54 is constantly engaged with and supported by a pair of reverse idler gears (not shown) as is well known in the art. Axially slidable clutches 56, 58, 60 and 62 are splined to the mainshaft for rotation therewith in a known manner. Clutch 56 may be selectively engaged to rotationally fix either the input shaft 12 or the gear 42 to the mainshaft. Clutch 58 may be selectively engaged to fix gear 44 or gear 46 to the mainshaft. Clutch 60 may be selectively engaged to fix gear 48 or gear 50 to the mainshaft. Clutch 62 may be utilized to fix gear 52 or gear 54 to the mainshaft.

The operation and structural features of the "floating" mainshaft, multiple countershaft type of transmission described above is well known in the prior art and a more detailed description thereof may be seen by reference to U.S. Pat. Nos. 3,105,395; 3,237,472; 3,335,616; and/or 3,500,695, all of which are assigned to the assignee of this invention and all of which are incorporated by reference.

In operation, the input shaft 12 drives input gear 14 which is constantly engaged with gears 24 and 24A to drive the two-piece countershafts 16 and 16A, the countershaft gears mounted thereon and the countershaft gear teeth formed thereon. The countershaft gears and reverse idlers are constantly engaged with the mainshaft gears and thus mainshaft gears 42, 44, 46, 48, 50, 52 and 54 are constantly rotating whenever the input shaft is rotating. The operator of the vehicle may, for example, move sliding clutch 62 to the right to rotationally couple gear 54 to the mainshaft to achieve a reverse rotation. Similarly, sliding clutch 62 may be moved to the left to couple gear 52 to the mainshaft 18 for operation in the first forward speed. Similarly, sliding clutch 60 may be utilized to engage gear 50 with the mainshaft for second speed or gear 48 with the mainshaft for third speed. In a similar manner clutch 58 may be utilized to engage gear 46 with the mainshaft for fourth speed or gear 44 with the mainshaft for fifth speed. Clutch 56 may be utilized to engage gear 42 with the mainshaft for sixth speed or to engage the input shaft 12 directly with the mainshaft 18 for seventh speed operation.

Figure 2:
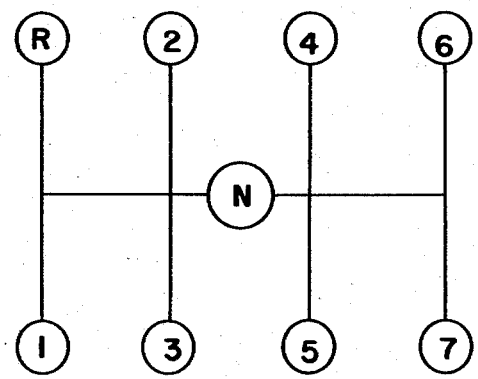
FIG. 2 is a schematic illustration of the shift pattern of the transmission of FIG. 1.

Reference to FIG. 2 will illustrate the four rail shift pattern followed by the operator.

The rearward countershaft pieces or portions, 22 and 22A are provided with spline like generally involute gear teeth 36 and 36A on the exterior surfaces thereof for direct meshing engagement with the gear teeth of first speed mainshaft gear 52 and the reverse idlers. To conserve material and/or space, at the forward ends, 64 and 64A, of the rear countershaft portions, the teeth 36 and 36A may be cut down to form external splines, 37 and 37A (not shown), engageable with internal splines 66 and 66A formed in the cavities 68 and 68A (not shown) formed in the enlarged rearward ends 70 and 70A of the forward countershaft portions 20 and 20A (see FIG. 4). The use of a substantially involute tooth profile for both gear and spline teeth is a well known and utilized practice in the transmission art. The splined connection will join the forward and rearward countershaft portions for joint rotation while allowing the shafts to operate properly if the portions are slightly out of coaxial alignment. The splines 36, 36A and/or 37, 37A may be crowned if desired to permit a greater degree of axial nonalignment between the forward and rear countershaft portions.

The countershafts 16 and 16A are supported at their forward ends by bearings 72 and 72A and at their rearward ends by bearings 74 and 74A. The countershafts are also supported by intermediate bearings 76 and 76A located adjacent the splined connection. Bearings 76 and 76A will provide support for the rearward ends, 70 and 70A, of the forward countershaft portions and the forward ends, 64 and 64a, of the rearward countershaft portions. The use of a three bearing countershaft support provides additional support allowing the countershafts to carry a greater torque load, an increased ratio of the gear meshes and/or be located at a greater distance from the mainshaft (i.e. increased center distance) than would be possible with a conventional two bearing support. The use of a three bearing support is possible within normal manufacturing tolerances as the forward and rearward countershaft portions may be slightly noncoaxial. The use of a spline connection wherein each of the splines are identically circumferentially axially aligned with the rear countershaft gear teeth allows for easy alignment, for timing, of the rear countershaft portions relative to the forward countershaft portions as will be discussed in detail below.

In a multiple substantially identical countershaft transmission of the type illustrated, it is important that each of the gear groups, such as gear group 26, 42, 26A, have a specific relationship so that the mainshaft gear will tend to rotate about its axis and the countershaft gears will tend to share the torque load in a substantially equal manner. Obtaining this relationship is usually referred to as "timing" the transmission and in a twin countershaft transmission is usually accomplished by providing mainshaft gears with an even number of teeth and providing substantially identical countershaft assemblies (i.e. countershaft and countershaft gears). The countershaft assemblies are assembled so that the countershaft gears on each countershaft are identically circumferentially aligned relative to the countershaft. This is usually accomplished by axially aligning one point (such as a gear tooth crest) with an axially extending location on the countershaft. In the case of a two-piece countershaft, which must be assembled during production and which is subject to disassembly and reassembly in the field, it is essential that an easy and reliable means be provided to assure that the two countershaft pieces are reassembled in a manner to maintain proper timing.

Figure 4:
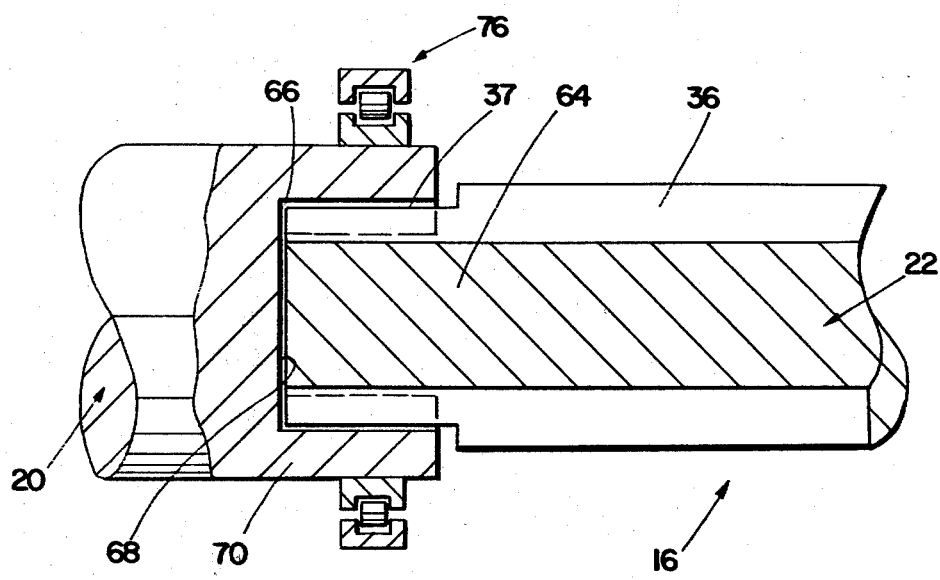
FIG. 4 is an enlarged, fragmentary view in section of a portion of the transmission of FIG. 1.
Figure 3:
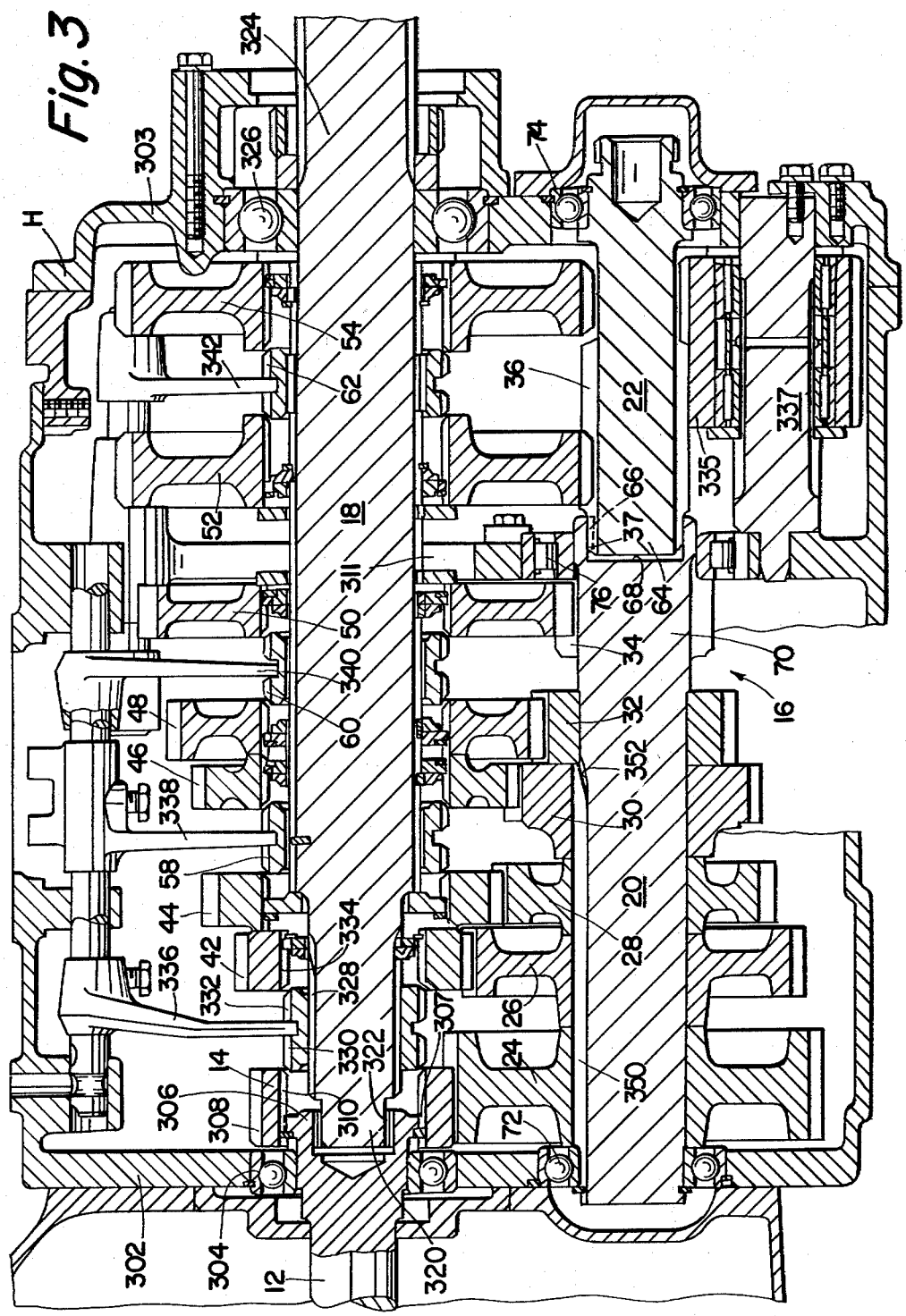
FIG. 3 is a sectional view of the transmission schematically illustration of FIG. 1.

FIGS. 3 and 4 illustrate the structural embodiment of the transmission 10 schematically illustrated in FIG. 1. Elements of the transmission structure illustrated in FIGS. 3 and 4 corresponding to those elements schematically illustrated in FIG. 1, will be assigned like reference numerals.

The multiple countershaft transmission 10 includes a horizontally split housing H, only a portion of which is shown. The housing H has a forward end wall 302 and a rearward end wall 303. Each of said endwalls is provided with openings for receipt of the various shaft bearings. The input shaft 12 is supported by bearing 304 and carries an enlarged splined head 306 on the rearward end thereof. The head 306 carries splines 307 which support the annular drive gear 14. The drive gear 14 has external gear teeth 308 and internal clutch teeth 310.

The transmission 10 includes two substantially identical or "twin" two-piece countershafts 16 and 16A, only one of which, 16, is illustrated. Countershaft 16 comprises a forward portion 20 and a rearward portion 22. Forward portion 20 of countershaft 16 is supported by bearings 72 and 76. Rearward portion 22 of countershaft 16 is supported by bearing 74 and the forward countershaft portion. Bearing 76 is received in an aperture formed in an intermediate wall 311 of housing H. The forward portion 20 of countershaft 16 carries thereon and fixed for rotation therewith countershaft gears 24, 26, 28, 30, 32 and 34. The rearward portion 22 of countershaft 16 carries countershaft gearing teeth 36 formed thereon. Countershaft gear 24 is in constant mesh with the input or drive gear 14. The term countershaft gear is intended to describe gear teeth formed directly on a countershaft as well as countershaft gears fixed to a countershaft.

Several of the countershaft gears carried by the forward countershaft portions, 20 and 20A, are mounted to the forward countershaft portions by means of a key 350 received in a keyway 352 formed in the forward countershaft portions. The slots in the inner diameter bore of each gear of the forward countershaft portion gear groups (i.e. 26 and 26A, 28 and 28A, etc.) mounted in this manner are substantially identically circumferentially located relative to the teeth of the gears to assure substantially identical circumferential positioning of such gears on each of the forward countershaft portions. Countershaft gears 32, 32A, 34 and 34A are mounted, as by welding or the like, in a manner whereby each forward countershaft and countershaft gear assembly is substantially identical. The keyways 352 and welded gears on the forward countershaft portions are identically circumferentially aligned on each of the forward countershaft portions with respect to the splines, 66 and 66A, formed in the rearward ends of the forward countershaft portions. Of course, any means or combination of means, such as welding, splines and/or keyways may be utilized to mount the forward countershaft portion countershaft gears to the forward countershaft portions in a manner such that the gears and splines, 66 and 66A, are in substantially identical circumferential alignment for each of the forward counter-shaft and countershaft gear assemblies.

The main shaft 18 also comprises the output unit of transmission 10. The mainshaft is arranged substantially coaxially with the input shaft 12 and is mounted for a degree of radial movement and/or floating movement relative to the countershafts 16 and 16A. In the embodiment illustrated, the forward end 320 of the mainshaft 18 is loosely received with a bushing 322 located in an annular recess at the rearward end of input shaft 12. The rearward end 324 of mainshaft 18 is pivotally supported by a bearing 326. Further details as to the mounting of the mainshaft may be seen by reference to U.S. Pat. No. 3,500,695. This type of a floating mounting of the mainshaft is for descriptive purposes only and is not intended to be limiting. Mainshaft gears 42, 44, 46, 48, 50, 52 and 54 encircle the mainshaft 18 for constant engagement with and support by the countershaft gears or idler gears as is well known in the prior art. Axially slidable clutch units 56, 58, 60 and 62 are utilized to selectively clutch the mainshaft gears, one at a time, to the mainshaft.

By way of example, mainshaft clutch unit 56 is slidingly mounted on the forward end of the mainshaft 18 on splines 328 and carries clutch teeth 330 which are engageable with the clutch teeth 310 on the input drive gear 14 upon leftward movement of said clutch unit 56. Clutch unit 56 also carries clutch teeth 332 which are engageable with suitable internal clutch teeth 334 in the mainshaft gear 42 upon rightward movement of the clutch unit 56. The remainder of the mainshaft clutch unit, 58, 60 and 62, operate in a similar manner and will not be described in further detail. Shift forks 336, 338, 340 and 342 are utilized to selectively move mainshaft clutch units 56, 58, 60 and 62, respectively, either to the right or to the left as is well known in the art.

The gears 42, 44, 46, 48, 50, 52 and 54 may be collectively termed "mainshaft gears" since they are all capable of drivingly engaging the mainshaft. However, in the preferred embodiment illustrated, it is emphasized that they are all suported on and by the countershaft gears (or reverse idlers) and that they merely surround and at times engage the mainshaft but are not supported on or by the mainshaft. Rather, the mainshaft will move both rotatably and about the pivot axis with respect to those of the mainshaft gears with which it is not clutched at a particular moment.

Synchronizers and/or blocking rings can, if desired, be provided between the interengageable exterior clutch teeth associated with the various clutch units and the internal clutch teeth associated with the various mainshaft gears.

The rear countershaft portion gear teeth 36 are preferably formed directly on the outer periphery of the rear countershaft portion 22. Preferably, the gear teeth 36 will be of a substantially involute form suitable for both gear teeth or spline teeth. Mainshaft gear 52 will be in direct meshing engagement with the teeth 36. Reverse mainshaft gear 54 will be constantly engaged with and supported by an idler gear 335 which also is constantly meshed with countershaft gear teeth 36. Idler gear 335 is supported for rotation on idler shaft 337. It is noted that the portion of teeth 36 aligned with mainshaft gear 54 have been removed allowing both first mainshaft gear 52 and reverse mainshaft gear 54 to be of substantially identical diameter and thus of the same ratio.

In the illustrated embodiment, the gear teeth 36 at the forward end 64 of the rear countershaft portion 22 are partially removed to form external splines 37 which are drivingly engaged with internal splines 66 formed in cavity 68 in the enlarged rearward end 70 of the forward countershaft portion 20. The removal of the radially outward portions of teeth 36 to form spline teeth 37 is for the purposes of allowing the rearward portion 70 of countershaft piece 20 to be of a smaller exterior diameter to conserve space and material. As the splines 37 are always aligned with teeth 36, the alignment of the rear countershaft gear teeth 36 relative to the teeth of the forward countershaft portion gears will be substantially identical for each of countershaft and countershaft gear assemblies whenever the countershaft portions 20 and 22 are in splined engagement.

It is noted that although the use of gear teeth 36 as the external splines of the rear countershaft portion splined connection is shown in the preferred embodiment, the use of separate splines each aligned identically with the rear countershaft gear teeth, which could be formed on gears splined, welded or keyed to the rear countershaft portion, or the use of a number of splines evenly divisible into the number of rear countershaft gear teeth and aligned therewith, will provide the above discussed benefits and is contemplated within the scope of the present invention. It is also contemplated that splines 37 and/or splines 66 may be crowned to allow a greater degree of misalignment between the countershaft portions 20 and 22. It is also contemplated that a connector, key or intermediate member may be utilized to provide a splined driving connection between countershaft portions 20 and 22 and such structure is specifically included within the meaning of splines and splined connection as used herein.

Although this invention has been described in its preferred form with a certain degree of particularity, it is understood that the present disclosure of the preferred form has been made only by way of example and that numerous changes in the details of construction and combination and arrangement of parts may be resorted to without departing from the spirit and the scope of the invention as hereinafter claimed.

We claim:

1. An improved simple change gear transmission of the type comprising an input shaft having an input gear thereon, a mainshaft, at least two substantially identical countershaft assemblies driven by said input gear, each of said countershaft assemblies comprising a countershaft having an axis of rotation substantially parallel to the axis of rotation of said mainshaft, each of said countershafts having a plurality of countershaft gears supported thereon for rotation therewith, a plurality of mainshaft gears surrounding said mainshaft and constantly meshed with one countershaft gear on each countershaft and clutch means for selectively clutching said mainshaft gears one at a time to said mainshaft, the improvement comprising:

each of said countershafts comprising a first portion and a second portion, said first and second portions of each of said countershafts drivingly engaged by a splined connection, said spline connection comprising a plurality of external spline teeth on one of said first and second portions and an equal number internal spline teeth on the other of said first and second portions, the number of spline teeth on each of said portions being evenly divisible into the number of countershaft gear teeth carried by any countershaft gear mounted on said first portion, each spline tooth of said plurality of spline teeth on said first portion having the same circumferential alignment with respect to the countershaft gear teeth carried by said first portion as each (the) other spline tooth of said plurality of spline teeth on said first portion, the circumferential alignment of each of said countershaft gears carried by each of said second (portion) portions relative to the (splines) spline teeth on said second portion being substantially identical to the circumferential alignment of the corresponding countershaft gear carried by the other second portion relative to the (splines) spline teeth on the other second portion.

2. The improved transmission of claim 1, wherein said mainshaft is radially movable relative to the axes of said countershafts and said mainshaft gears are radially movable relative to said mainshaft and supported by the countershaft gears meshed therewith.

3. The improved transmission of claim 2 wherein said mainshaft gear and countershaft gears are spur gears.

4. The improved transmission of claim 1, wherein said first and second portions are in direct splined connection.

5. The improved transmission of claims 1, 2, or 3 wherein said first portion is a rearward portion, said second portion is a forward portion, said plurality of external spline teeth are carried by said rearward portion, the gear teeth of one of the countershaft gears carried by said rearward portion are formed integrally on said rearward portion and said external spline teeth carried by said rearward portion aligned with said countershaft gear teeth formed integrally on said rearward portion, and additionally comprising a first bearing supporting the forward end of said forward portion, a second bearing supporting the rearward end of said rearward portion and a third bearing supporting one of said forward and rearward portion adjacent said splined connection.

6. The improved transmission of claim 5, wherein all of the countershaft gear teeth carried by said rearward portion are formed integrally on said rearward portion, the spline teeth comprising axial continuations of said countershaft gear teeth.

7. The improved transmission of claim 6, wherein said countershaft gear teeth and said spline teeth carried by said rearward countershaft portion have a substantially identical involute tooth form.

8. The improved transmission of claim 7, wherein the radially outward portion of said countershaft gear teeth carried by said rearward countershaft portions is removed at the forward end of said rearward portion the spline teeth carried by said rearward portion comprising the remaining portions of said partially removed teeth.

9. The improved transmission of claim 7, wherein said splined connection comprises crowned splines.

10. The improved transmission of claim 5, wherein said rearward portion is provided with a plurality of axially extending exterior substantially involute shaped teeth on the outer periphery thereof, the involute shaped teeth at the forward end of said rearward portion engaged with internal spline teeth formed in the rearward end of said forward portion, at least one mainshaft gear meshingly engaged with said involute shaped teeth at a point axially interposed said second and third bearings.

11. The improved transmission of claim 10, wherein an idler gear is meshingly engaged with said involute shaped teeth, said idler gear meshingly engaged with a reverse speed mainshaft gear.

12. The improved transmission of claim 1 whereby whenever said first and second countershaft portions are drivingly engaged by said splined connection the circumferential alignment of each countershaft gear on one of said countershafts relative to the other countershaft gears on said one of said countershafts is substantially identical to the circumferential alignment of each corresponding countershaft gear on the other of said countershafts relative to the other corresponding countershaft gears on said other of said countershafts.

* * * * *